A. FTYKLO.
FISH TRAP.
APPLICATION FILED JULY 28, 1921.
1,407,744.
Patented Feb. 28, 1922.
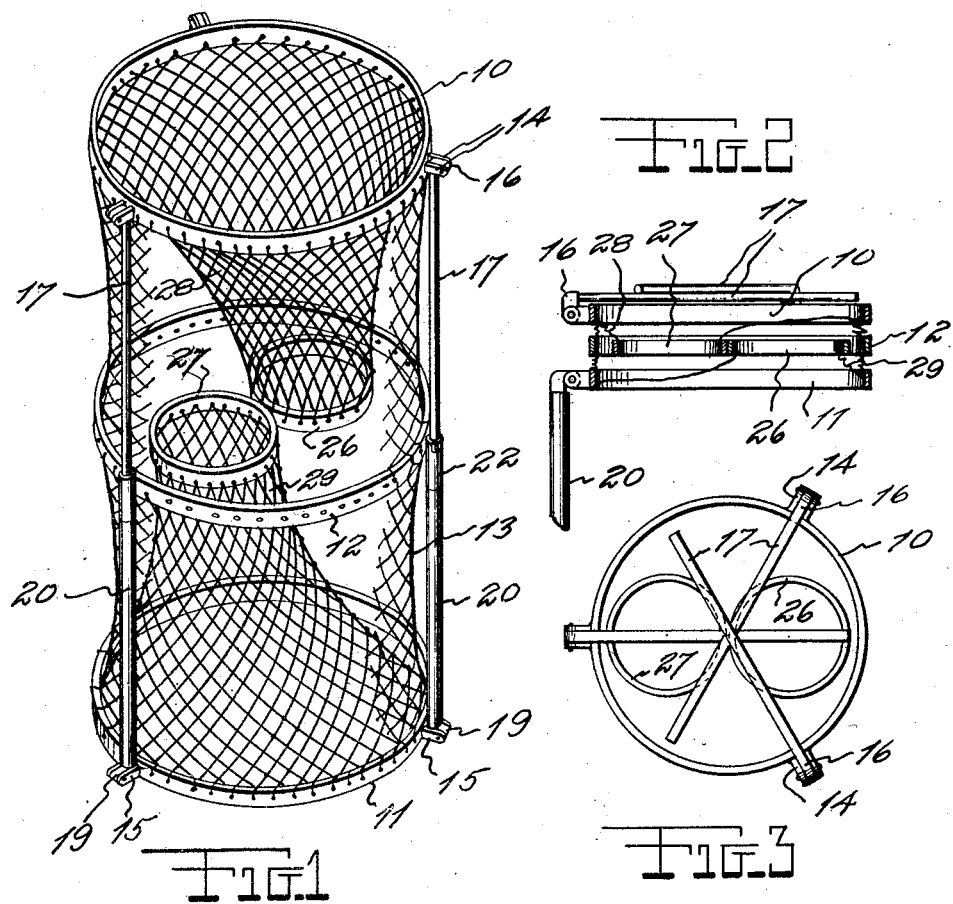
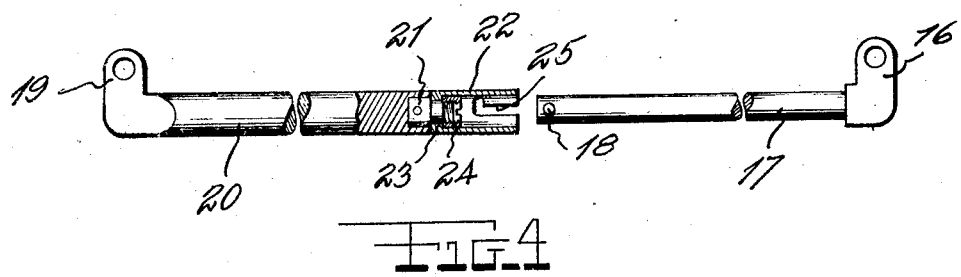
INVENTOR
Andy Ftyklo
BY
ATTORNEY

UNITED STATES PATENT OFFICE.

ANDY FTYKLO, OF BRAZNELL, PENNSYLVANIA.

FISH TRAP.

1,407,744.     Specification of Letters Patent.     Patented Feb. 28, 1922.

Application filed July 28, 1921. Serial No. 488,126.

*To all whom it may concern:*

Be it known that I, ANDY FTYKLO, a citizen of Poland, residing at Braznell, in the county of Fayette and State of Pennsylvania, have invented certain new and useful Improvements in Fish Traps, of which the following is a specification.

This invention relates to improvements in fish traps and its principal object is to provide a device so designed as to be easily set up ready for use and collapsed for transportation.

Another object of the invention is to provide a novel form of stretcher bar, for holding the rings of the trap in spaced relation, having an interchangeable socket member so that by substitution of socket members of varying length the bar may be shortened or lengthened to suit different requirements.

With these and other objects in view the invention consists in the novel construction, combination and arrangement of parts which will be fully set forth in the following specification, claimed and illustrated in the accompanying drawing, in which, Figure 1 is a perspective view of the trap showing the same extended.

Figure 2 is a sectional view through the trap showing the same collapsed.

Figure 3 is an end view of Figure 2, and

Figure 4 is a side view of one of the stretcher members showing a portion thereof in section.

Referring to the drawings in detail the numeral 10 designates one of the end rings of the body of the trap in alinement with which is arranged the end ring 11 and the intermediate ring 12. A suitable netting 13 of tubular formation is secured to the rings to form the body of the trap.

Formed at spaced intervals on the exterior of the ring 10 are pairs of outwardly extending parallel ears 14 and similar ears 15 are secured to the ring 11 in longitudinal alinement with the ears 14. Pivoted between each pair of ears 14 is an arm 16 carrying a rod 17 which extends at right angles thereto and is provided near its free end with a pin 18 for a purpose to be more fully hereinafter described. An arm 19 is pivotally mounted between each pair of bars 15 on the ring 11 and is formed integrally with the rod 20 which extends at right angles to said arm. A threaded stud 21 is fitted in the free end of the rod 20 to provide an attaching means for the interchangeable rod section.

The interchangeable rod section above mentioned comprises a tubular body 22 of a diameter to receive the free end of the rod 17 and provided at one end with an inwardly extending flange 23 forming a shoulder for engagement with an internally threaded collar 24 which is adapted to fit the stud 21. Extending longitudinally into one side of the tubular body opposite its flanged end is a bayonet slot 25 for the reception of a pin 18 by means of which the rods 17 and 20 are secured in longitudinal alinement and against accidental displacement.

Secured within the body 13 in a plane with the ring 12 are rings 26 and 27 to which the funnel shaped netting sections 28 and 29 are secured respectively, the larger ends of which are respectively secured to the rings 10 and 11, thus providing chambers at opposite ends of the device, entrance to which may be had only through the rings 26 and 27.

Obviously in setting up the trap the rods 17 and 20 are swung into the position shown in Figure 1 and the end rod 17 entered into the socket member 22 in such a manner as to allow pins 18 to enter the bayonet slots 25, after which a slight rotation of the socket member will cause the pin to engage behind the shoulder in said slot 25 and thereby lock the rods against disengagement.

While in the foregoing there has been shown and described the preferred embodiment of this invention, it is to be understood that minor changes in the details of construction, combination and arrangement of parts may be made without departing from the spirit and scope of the invention as claimed.

What is claimed is:—

A fish trap comprising a pair of rings, a tubular net attached thereto and supported therebetween, pairs of ears arranged in spaced relation on each ring, rod sections pivoted between the pairs of ears, a rotatable socket member on each of the rod sections, one of said socket members having a bayonet slot therein, and pins extending through each opposite rod section and adapted to enter the bayonet slot.

In witness whereof I affix my signature.

ANDY FTYKLO.